(12) United States Patent
Nagai

(10) Patent No.: US 9,459,133 B2
(45) Date of Patent: Oct. 4, 2016

(54) HOPPER AND COMBINATION WEIGHER USING HOPPER

(75) Inventor: Takayuki Nagai, Kobe (JP)

(73) Assignee: YAMATO SCALE CO., LTD., Akashi-shi, Hyogo (JP)

( * ) Notice: Subject to any disclaimer, the term of this patent is extended or adjusted under 35 U.S.C. 154(b) by 485 days.

(21) Appl. No.: 13/881,138

(22) PCT Filed: Oct. 27, 2010

(86) PCT No.: PCT/JP2010/006341
§ 371 (c)(1),
(2), (4) Date: Jul. 17, 2013

(87) PCT Pub. No.: WO2012/056495
PCT Pub. Date: May 3, 2012

(65) Prior Publication Data
US 2013/0292191 A1 Nov. 7, 2013

(51) Int. Cl.
*G01G 19/393* (2006.01)
*G01G 21/22* (2006.01)

(52) U.S. Cl.
CPC ............ *G01G 19/393* (2013.01); *G01G 21/22* (2013.01)

(58) Field of Classification Search
CPC ................ G01G 13/00–13/34; G01G 19/387; G01G 19/393; G01G 21/22
See application file for complete search history.

(56) References Cited

U.S. PATENT DOCUMENTS

| | | | |
|---|---|---|---|
| 4,497,385 A * | 2/1985 | Sashiki ................. | G01G 13/00 177/244 |
| 4,570,727 A * | 2/1986 | Ueda ......................... | 177/25.18 |
| 4,602,709 A * | 7/1986 | Ueda ............................. | 193/2 R |
| 4,683,966 A * | 8/1987 | Nakagawa et al. ........ | 177/25.18 |
| 4,819,749 A * | 4/1989 | Guardiola .................. | 177/25.18 |
| 5,317,110 A * | 5/1994 | Dauder Guardiola ..... | 177/25.18 |
| 5,379,923 A * | 1/1995 | Sagastegui et al. ....... | 222/181.2 |
| 5,737,904 A * | 4/1998 | Simionato ...................... | 53/502 |

(Continued)

FOREIGN PATENT DOCUMENTS

| | | |
|---|---|---|
| CN | 101061378 A | 10/2007 |
| JP | 04-118528 | 4/1992 |

(Continued)

OTHER PUBLICATIONS

Office Action for CN 2010068499.X dated Jan. 2, 2014.

(Continued)

*Primary Examiner* — Peter Macchiarolo
*Assistant Examiner* — Natalie Huls
(74) *Attorney, Agent, or Firm* — Marshall, Gerstein & Borun LLP

(57) ABSTRACT

A hopper in a combination weigher comprises a tubular hopper body having an upper opening and a lower opening and being fed with the objects forming the combination, through the upper opening, and a discharge gate which opens and closes the lower opening of the hopper body; wherein the hopper body includes a tubular body having four or more side walls connected together in an annular shape, the tubular body having a horizontal cross section having convex regions; and wherein the hopper body has a shape in which at a boundary portion between adjacent side walls of all pairs, an angle which is formed between a first virtual plane contacting one of the adjacent side walls and a second virtual plane contacting the other side wall, is equal to or greater than 90 degrees.

6 Claims, 6 Drawing Sheets

(56) References Cited

U.S. PATENT DOCUMENTS

| | | | | |
|---|---|---|---|---|
| 5,765,655 | A | * | 6/1998 | Tatsuoka .................. 177/25.18 |
| 5,981,881 | A | * | 11/1999 | Kawanishi et al. ........ 177/25.18 |
| D664,871 | S | * | 8/2012 | Nagai ............................ D10/94 |
| D664,872 | S | * | 8/2012 | Nagai ............................ D10/94 |
| D665,682 | S | * | 8/2012 | Nagai ............................ D10/94 |
| D665,683 | S | * | 8/2012 | Nagai ............................ D10/94 |
| D665,684 | S | * | 8/2012 | Nagai ............................ D10/94 |
| 2002/0153177 | A1 | * | 10/2002 | Schmidhuber ................ 177/145 |
| 2002/0157874 | A1 | * | 10/2002 | Wako et al. ............... 177/25.18 |
| 2002/0157875 | A1 | * | 10/2002 | Tanaka et al. ............. 177/25.18 |
| 2005/0109547 | A1 | * | 5/2005 | Sugioka et al. ................ 177/60 |
| 2006/0266560 | A1 | * | 11/2006 | Nakajima et al. ......... 177/25.18 |
| 2008/0245578 | A1 | * | 10/2008 | Kawanishi et al. ........ 177/25.11 |
| 2009/0178861 | A1 | * | 7/2009 | Hayakawa et al. ............ 177/245 |
| 2009/0301792 | A1 | * | 12/2009 | Kawanishi .................. 177/25.18 |
| 2010/0044116 | A1 | * | 2/2010 | Kishikawa et al. ........ 177/25.18 |
| 2010/0096192 | A1 | * | 4/2010 | Kawanishi .................. 177/25.18 |
| 2011/0036645 | A1 | * | 2/2011 | Kageyama et al. ........ 177/25.18 |
| 2013/0216338 | A1 | * | 8/2013 | Suzuki et al. ................. 414/288 |
| 2013/0284523 | A1 | * | 10/2013 | Takayanagi et al. ......... 177/162 |

FOREIGN PATENT DOCUMENTS

| | | |
|---|---|---|
| JP | 07-092011 | 4/1995 |
| JP | 9-196746 | 7/1997 |
| JP | 2001-146319 A | 5/2001 |
| JP | 2001-272267 A | 10/2001 |
| JP | 2003-207383 A | 7/2003 |

OTHER PUBLICATIONS

International Search Report for PCT/JP2010/006341, mailed Nov. 22, 2010.

* cited by examiner

PRIOR ART

HOPPER AND COMBINATION WEIGHER USING HOPPER

FIELD OF THE INVENTION

The present invention relates to a hopper for use in a combination weigher and the combination weigher using the hopper.

BACKGROUND OF THE INVENTION

Conventionally, a combination weigher uses a plurality of hoppers. The combination weigher is configured such that a plurality of weighing hoppers which hold objects therein and are supported on load cells to weigh weights of the objects held therein are arranged in, for example, a circular shape, and feeding hoppers which feed the objects to the weighing hoppers, respectively, are arranged above the weighing hoppers, respectively. Each of the weighing hoppers has a horizontal cross-section of a rectangular shape, and each of the feeding hoppers has a horizontal cross-section of a rectangular shape (see, for example, Patent Literature 1, Patent Literature 2).

FIG. 6A is a plan view showing a shape and layout of hoppers (feeding hoppers or weighing hoppers) in a conventional combination weigher. FIG. 6B is an enlarged view of a portion of FIG. 6A.

In the conventional combination weigher, the hoppers (rectangular hoppers) 52 each having a horizontal cross-section of a rectangular shape are arranged in a circular shape around a center base body 51. Each of the hoppers 52 is configured such that a discharge gate which is a lid of a lower opening is attached to a tubular hopper body having upper and lower portions which are open. In FIGS. 6A and 6B, only the hopper bodies are illustrated but the discharge gates and the like are not illustrated.

CITATION LISTS

Patent Literature

Patent Literature 1: Japanese Laid-Open Patent Application Publication No. 2001-146319
Patent Literature 2: Japanese Laid-Open Patent Application Publication No. 2003-207383

SUMMARY OF THE INVENTION

The hopper such as the weighing hopper and the feeding hopper for use in the combination weigher is attached with the discharge gate on the tubular hopper body. The hopper body is required to have a stiffness to hold the fed objects therein. However, since the conventional hopper has a horizontal cross-section of a rectangular shape, its hopper body has a greater thickness, which increases a weight of the hopper body. The combination weigher is typically used to weigh food. It is necessary to wash the hopper for sanitation requirements. An operator detaches the hopper from the combination weigher and washes it. The hopper which is heavy in weight would place a considerable burden on the operator.

The weighing hopper is supported on the load cell. A weighing unit from the load cell to the weighing hopper may be assumed as cantilevered. Therefore, when a tare weight of the weighing hopper is great, a characteristic frequency of the weighing unit is lowered, which degrades a responsiveness.

The present invention is directed to solving the above described problems and an object of the present invention is to provide a hopper for use in a combination weigher, which can reduce its weight so that a burden placed on an operator who carries out a work for attaching, detaching, washing, etc., of the hopper, and a combination weigher using the hopper.

Another object of the present invention is to provide a combination weigher which can improve a responsiveness of a weighing unit including a load cell supporting a weighing hopper.

To achieve the above objective, according to the present invention, there is provided a hopper which is used in a combination weigher which finds a combination of objects whose total weight falls within a predetermined weight range and discharges the objects making up the combination, the hopper comprising a tubular hopper body having an upper opening and a lower opening and being fed with the objects which are used to find the combination, through the upper opening, and a discharge gate which opens and closes the lower opening of the hopper body; wherein the hopper body is constituted by a tubular body having 4 or more side walls connected together in an annular shape, the tubular body having a horizontal cross section having a contour of a shape having convex regions and being different from a rectangular shape; and wherein the hopper body has a shape in which at a boundary portion between adjacent side walls of all pairs, an angle which is formed between a first virtual plane contacting one of the adjacent side walls and a second virtual plane contacting the other side wall, and is located at a side of a region to which the objects are fed, is equal to or greater than 90 degrees.

In accordance with this configuration, since a stiffness of the hopper can be maintained even when the thickness of the hopper body (thickness of the side wall) is thinned, the thickness of the hopper body can be thinned, and the weight of the hopper can be reduced. Therefore, it becomes possible to lessen a burden placed on an operator who carries out a work for attaching, detaching, washing, etc., of the hopper attached to the combination weigher.

The hopper body may have a horizontal cross-section having a contour of a convex-shaped polygonal shape having 5 or more sides. In this case, since the hopper body is formed by 5 or more side walls of flat plate shape (flat surface shape), and the side walls constituting the hopper body have a flat plate shape, the hopper body can be easily processed, when it is manufactured.

A combination weigher of the present invention comprises a plurality of hoppers each of which is of the present invention as described above.

In accordance with this configuration, the weight of the hopper can be reduced, and it becomes possible to lessen a burden placed on an operator who carries out a work for attaching, detaching, washing, etc., of the hopper attached to the combination weigher.

A combination weigher of the present invention comprises a plurality of weighing hoppers arranged in a circular shape around a casing and each including a hopper of the above stated present invention, a plurality of load cells disposed inside of the casing and supporting the weighing hoppers, respectively, via coupling members penetrating the casing; wherein the side walls of an arbitrary weighing hopper of the weighing hoppers which side walls are adjacent to another weighing hoppers, have a flat plate shape and surfaces of the side walls and a center of a circle along which the plurality of weighing hoppers are arranged are included within the same plane.

In accordance with this configuration, the weight of the weighing hopper can be reduced. Therefore, it becomes possible to lessen a burden placed on an operator who carries out a work for attaching, detaching, washing, etc., of the hopper attached to the combination weigher. Since the side walls of an arbitrary weighing hopper which side walls are adjacent to another weighing hoppers, have a flat plate shape and surfaces of the side walls and the center of the circle along which the plurality of weighing hoppers are arranged are included within the same plane, a space (gap) between adjacent weighing hoppers can be reduced, an outer peripheral radius of a region where the weighing hoppers are arranged can be reduced, and a center-of-gravity of the weighing hopper can be made closer to the load cell inside of the casing. Since the center-of-gravity of the weighing hopper can be made closer to the load cell, and the weight of the weighing hopper can be reduced, a characteristic frequency of a weighing unit including the weighing hopper and the load cell can be increased, and its responsiveness can be improved. As a result, a weighing speed of the combination weigher can be increased. Since the outer peripheral radius of the region where the weighing hoppers are arranged can be reduced, the combination weigher can be made compact.

A combination weigher of the present invention comprises a plurality of weighing hoppers arranged in a circular shape around a casing and each including a hopper of the above stated present invention, and a plurality of load cells provided inside of the casing and supporting the weighing hoppers, respectively, via coupling members penetrating the casing; wherein in adjacent weighing hoppers, a side wall of one of the adjacent weighing hoppers, which side wall is adjacent to the other weighing hopper, and a side wall of the other weighing hopper which side wall is adjacent to the one weighing hopper, are substantially parallel to each other.

In accordance with this configuration, the weight of the hopper can be reduced. Therefore, it becomes possible to lessen a burden placed on an operator who carries out a work for attaching, detaching, washing, etc., of the hopper attached to the combination weigher. Since the side wall of one of the adjacent weighing hoppers, which side wall is adjacent to the other weighing hopper, and the side wall of the other weighing hopper which side wall is adjacent to the one weighing hopper, are substantially parallel to each other, a space (gap) between adjacent weighing hoppers can be reduced, the outer peripheral radius of the region where the weighing hoppers are arranged can be reduced, and the center-of-gravity of the weighing hopper can be made closer to the load cell inside of the casing. Since the center-of-gravity of the weighing hopper can be made closer to the load cell, and the weight of the weighing hopper can be reduced, a characteristic frequency of a weighing unit including the weighing hopper and the load cell can be increased, and its responsiveness can be improved. As a result, a weighing speed of the combination weigher can be increased. Since the outer peripheral radius of the region where the weighing hoppers are arranged can be reduced, the combination weigher can be made compact.

The side wall of one of the adjacent weighing hoppers, which side wall is adjacent to the other weighing hopper, and the side wall of the other weighing hopper which side wall is adjacent to the one weighing hopper, may extend along a virtual line extending between the side walls and to a center of a circle along which the plurality of weighing hoppers are arranged.

A portion of the side wall of the weighing hopper, which portion is at an opposite side of the casing, may have a horizontal cross-section of a circular-arc shape.

In the specification and Claims, the term "convex region" is defined as follows. When all points on a line segment connecting arbitrary two points within a region D in a plane are included within the region D, this region D is referred to as the convex region.

The present invention has been configured as described above, and has an advantage that it is possible to provide a hopper which can reduce its weight so that a burden placed on an operator who performs a work for attaching, detaching, washing, etc., the like of the hopper, and a combination weigher using the hopper.

In addition, the present invention has an advantage that it is possible to provide a combination weigher which can improve a responsiveness of a weighing unit including a load cell supporting a weighing hopper.

The above and further objects, features and advantages of the present invention will more fully be apparent from the following detailed description of preferred embodiments with accompanying drawings.

DETAILED DESCRIPTION

Hereinafter, preferred embodiments of the present invention will be described with reference to the drawings. Hereinafter, throughout the drawings, the same or corresponding components are identified by the same reference symbols, and will not be described in repetition. The present invention is not limited to the embodiments described below.

EMBODIMENT 1

Figure 1:
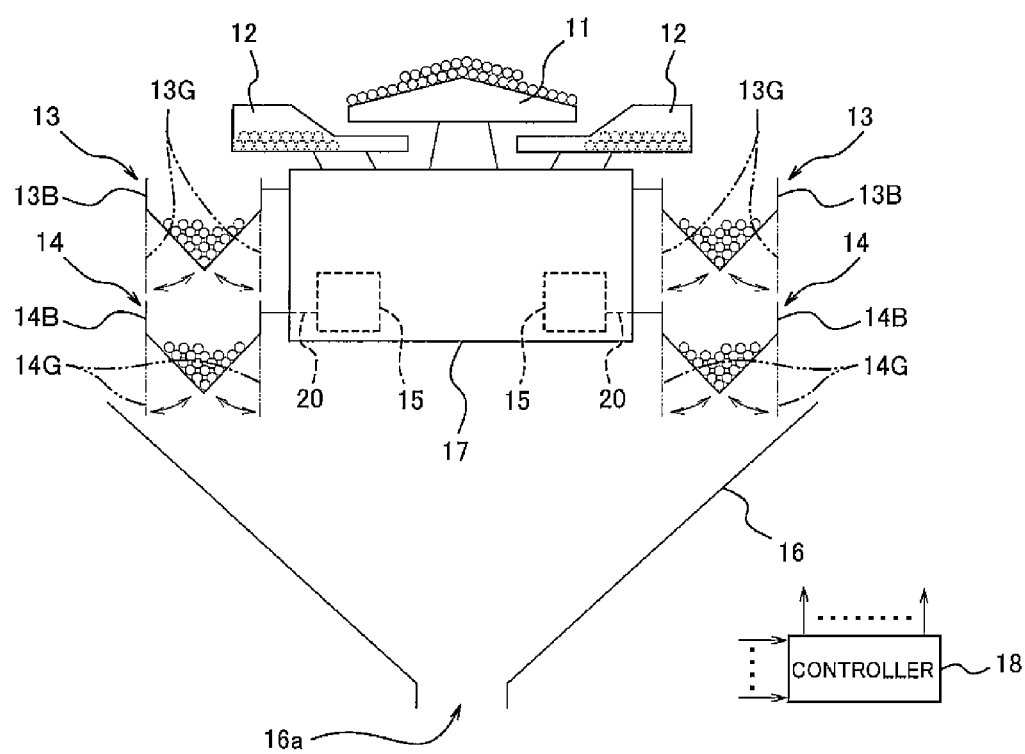
FIG. 1 is a view showing an exemplary schematic configuration of a combination weigher according to Embodiment 1 of the present invention.

FIG. 1 is a view showing an exemplary schematic configuration of a combination weigher according to Embodiment 1 of the present invention.

This combination weigher includes a center base body 17 (casing) supported by, for example, four legs (not shown) at a center portion thereof. The center base body 17 has an external appearance of a substantially cylindrical or regular prism shape. A dispersion feeder 11 and linear feeders 12 are disposed on an upper surface of the center base body 17, while feeding hoppers 13 and weighing hoppers 14 are disposed around a side surface of the center base body 17.

The feeding hoppers 13 are supported on the center base body 17, while the weighing hoppers 14 are supported on load cells 15 fastened to inside of the center base body 17 via coupling members 20, respectively. An actuator (not shown) and the like of discharge gates 13G of the feeding hoppers 13 and discharge gates 14G of the weighing hoppers 14 are provided inside of the center base body 17.

The dispersion feeder 11 has a conical shape to radially disperse the objects supplied from an outside supplying device (not shown) to its center portion, by vibration. Around the dispersion feeder 11, the linear feeders 12 which feed the objects sent from the dispersion feeder 11 to the feeding hoppers 13 by vibration are provided. Below the linear feeders 12, the plurality of feeding hoppers 13 and the plurality of weighing hoppers 14 are provided so as to correspond to the linear feeders 12, and arranged in a circular shape. Each of the feeding hoppers 13 has a tubular hopper body 13B attached with the discharge gate 13G. The feeding hopper 13 holds therein the objects sent from the linear feeder 12, for a specified time, and opens its discharge gate 13G to discharge the objects to the weighing hopper 14 located below the feeding hopper 13.

Each of the weighing hoppers 14 has a tubular hopper body 14B attached with the discharge gate 14G. The weighing hopper 14 holds therein the objects supplied from the feeding hopper 13 located thereabove, and opens its discharge gate 14G to discharge the objects to a collecting chute 16. The weighing hopper 14 is supported on a load cell 15 which is a load detector via the coupling member 20 penetrating the center base body 17. The coupling member 20 is inserted into a through-hole (not shown) provided in the center base body 17 to couple the weighing hopper 14 to the load cell 15. The load cell 15 outputs a load signal (electric signal) to a controller 18.

Below the weighing hoppers 14 arranged in the circular shape, the collecting chute 16 of a substantially inverted circular truncated cone shape is disposed. The objects discharged from the weighing hoppers 14 slide on and along the collecting chute 16 and are discharged to, for example, a packaging machine (not shown) through a discharge outlet 16a at a bottom portion thereof.

The controller 18 includes, for example, a microcontroller including a CPU and memories such as ROM and RAM which contain operation programs, operation parameters, etc., of the CPU. The CPU executes the operation programs stored in the ROM, to, for example, control an operation of the overall combination weigher. That is, the controller 18 controls a vibration amplitude and operation time of each of the dispersion feeder 11 and the linear feeders 12. In addition, the controller 18 controls the actuator for opening and closing the discharge gates 13G of the feeding hoppers 13 and the discharge gates 14G of the weighing hoppers 14.

The controller 18 serves as a weight calculating means which receives the load signals as inputs output from the load cells 15 supporting the weighing hoppers 14, and calculates weights of the objects held in the weighing hoppers 14 based on the load signals. In addition, the controller 18 serves as a combination means which performs a combination process. In this combination process, the controller 18 performs combination calculation based on the calculated weights of the objects, and finds one combination of the objects whose total weight falls within a predetermined weight range and determines it as a discharge combination.

The controller 18 causes the discharge gates 14G of the weighing hoppers 14 holding the objects therein selected to make up the discharge combination to open and close at a predetermined timing, to discharge the objects from the weighing hoppers 14. To the weighing hoppers 14 which have discharged the objects and have been emptied, the feeding hoppers 13 located thereabove feed the objects. To the feeding hoppers 13 which have been emptied, the linear feeders 12 located thereabove feed the objects.

The controller 18 need not be constituted by a single controller, but a plurality of controllers may be dispersed and cooperate with each other to control the operation of the combination weigher.

Figure 2:
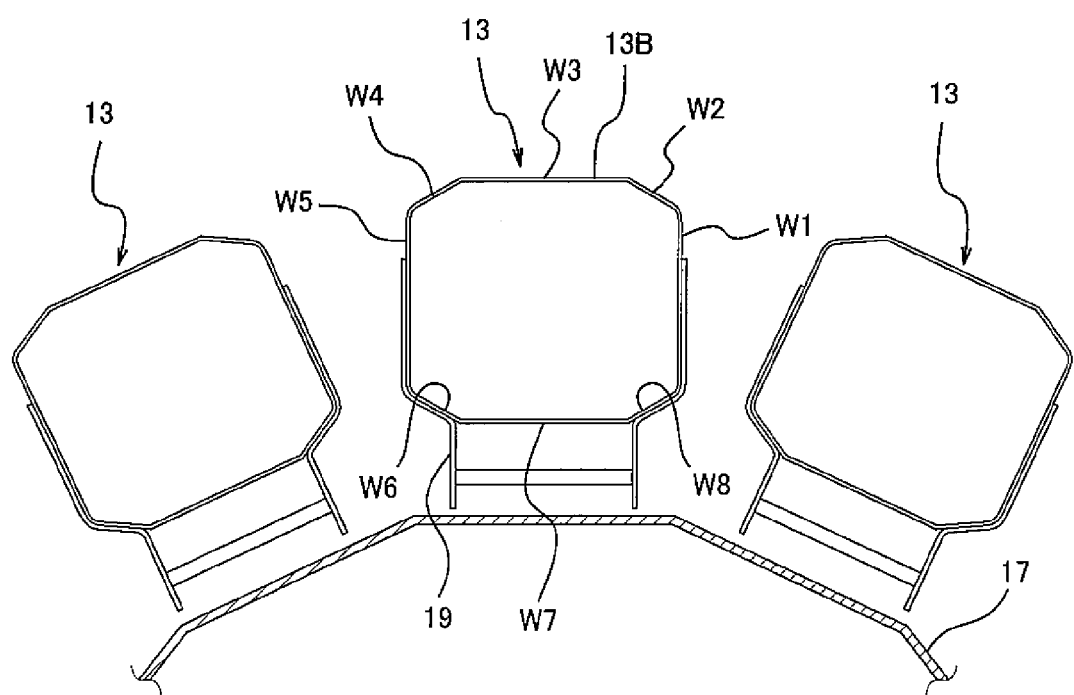
FIG. 2 is a plan view showing an exemplary schematic configuration of feeding hoppers for use in the combination weigher of Embodiment 1.

FIG. 2 is a plan view showing an exemplary schematic configuration of the feeding hoppers 13 for use in the combination weigher of the present embodiment. The feeding hoppers 13 are mounted to the center base body 17 in such a manner that mounting members 19 fastened to the hopper bodies 13B of the feeding hoppers 13 are mounted to hopper holding sections (not shown) provided on the center base body 17. In FIG. 2, the discharge gates of the feeding hoppers 13 and the hopper holding sections, and the like are not shown.

The hopper body 13B of each of the feeding hoppers 13 has eight side walls W1 to W8 and has a tubular shape having an upper opening and a lower opening. The hopper body 13B has a horizontal cross-section having an octagonal contour defined by the eight side walls W1 to W8. The upper opening of the hopper body 13B has an octagonal shape in a plan view. The discharge gate 13G (FIG. 1) opens and closes the lower opening of the hopper body 13B. The objects are fed through the upper opening in a state in which the discharge gate 13G is closed and the lower opening is closed. When the discharge gate 13G is opened, the lower opening is opened and thereby the objects are discharged.

The weighing hopper 14 is configured like the feeding hopper 13 as described above with reference to FIG. 2. The weighing hopper 14 is mounted to the load cell 15 in such a manner that a mounting member 19 (see FIG. 2) fastened to the hopper body 14B is mounted to a hopper holding section (not shown) provided at the coupling member 20.

Figure 6A:
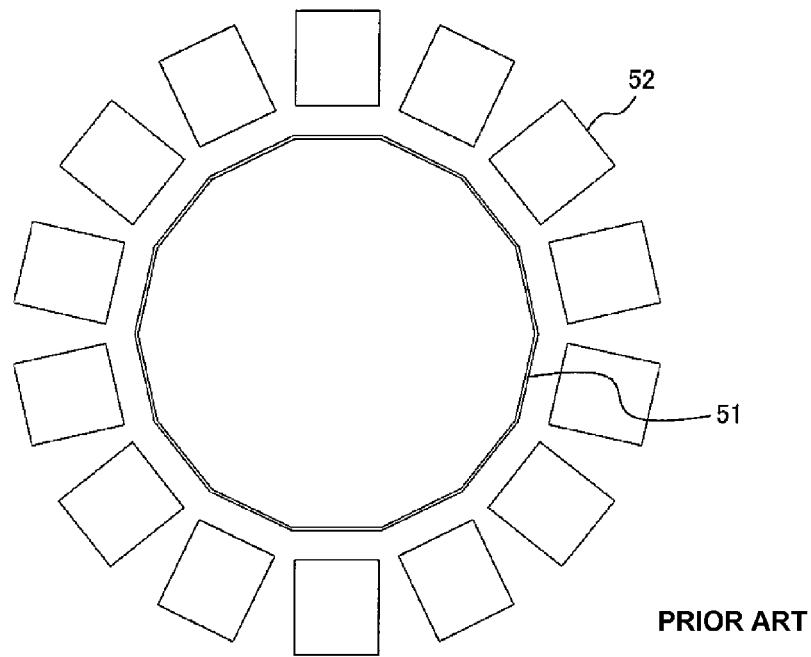
FIG. 6A is a plan view showing a shape and layout of hoppers in a conventional combination weigher.
Figure 6B:
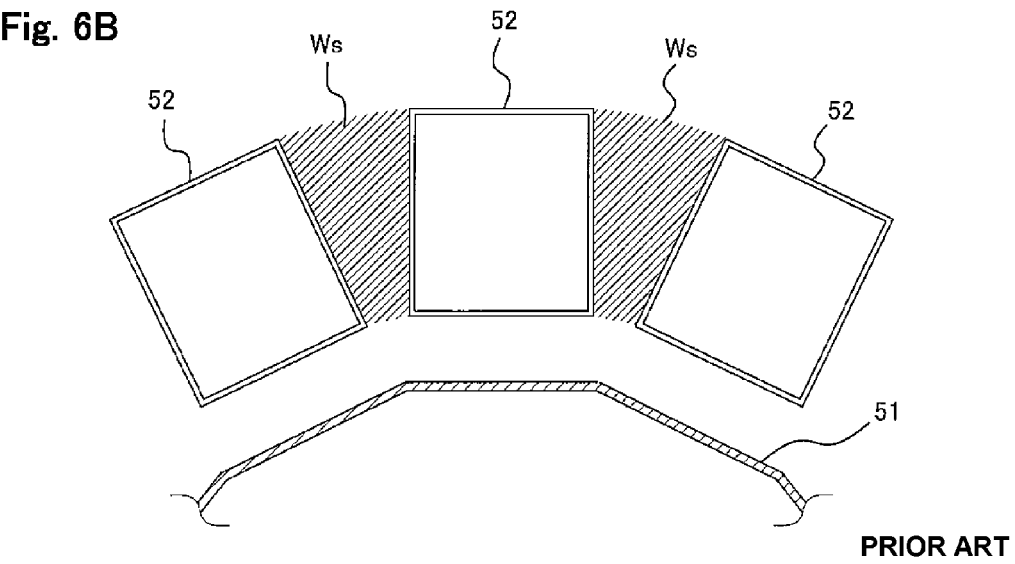
FIG. 6B is an enlarged view of a portion of FIG. 6A.

The conventional rectangular hopper 52 (see FIG. 6) has a rectangular contour of a rectangular shape or a square shape. On the other hand, the contour of the hopper of the present embodiment has a polygonal shape having five or more angular portions. Since the hopper has more angular portions, a second moment in the cross-section can be improved, the hopper is not deformed easily, and has a higher stiffness. That is, the hopper body 13B of the feeding hopper 13 has eight side walls and its horizontal cross-section has the octagonal contour, while the hopper body 14B of the weighing hopper 14 has eight side walls and its horizontal cross-section has the octagonal contour. In this configuration, as compared to the conventional rectangular hopper 52, a reduction of the stiffness of the hopper body 13B and a reduction of the stiffness of the hopper body 14B can be prevented, even when the side wall of the hopper body 13B and the side wall of the hopper body 14B are thinned. As a result, the side wall of the hopper body 13B and the side wall of the hopper body 14B can be thinned, and the weight of the feeding hopper 13 and the weight of the weighing hopper 14 can be reduced. Because of this reduced weights, it becomes possible to lessen a burden placed on an operator when the operator detaches the feeding hopper 13 and the weighing hopper 14, washes them, etc.

Since the horizontal cross-section of each of the hopper bodies 13B and 14B has the octagonal contour having inner angles which are greater than 90 degrees (i.e., angles formed by adjacent side walls are greater than 90 degrees), powders of the objects and the like are less likely to stay in corner portions of the hopper bodies 13B and 14B, and the hopper bodies 13B and 14B are cleaned more easily as compared to the conventional rectangular hopper 52.

Since the weighing unit from the load cell 15 to the weighing hopper 14 may be assumed as cantilevered, the characteristic frequency of the weighing unit can be increased, and thus, a responsiveness can be improved, by reducing the weight of the weighing hopper 14. As a result, a weighing speed of the combination weigher can be increased.

Figure 3A:
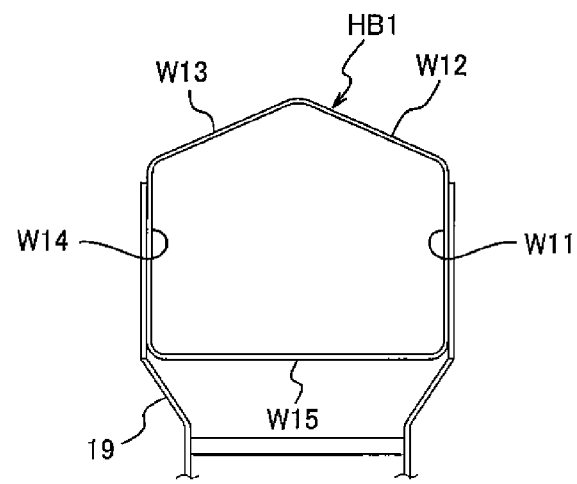
FIGS. 3A, 3B and 3C are plan views showing another examples of a hopper body for use in the feeding hopper and a weighing hopper of Embodiment 1.
Figure 3B:
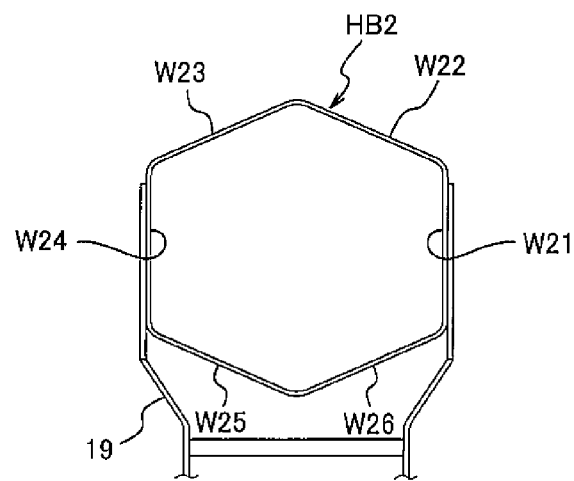
Figure 3C:
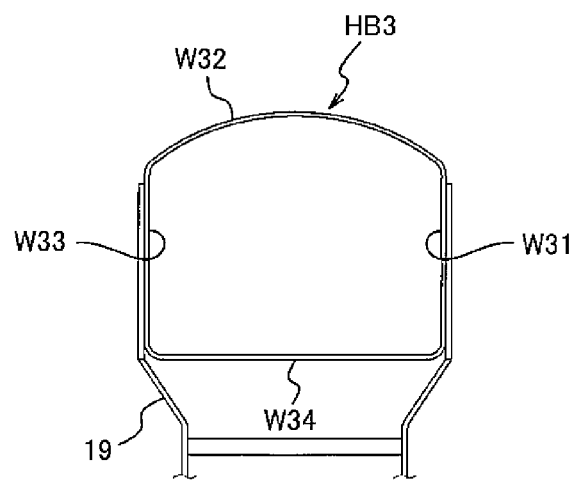

FIGS. 3A, 3B and 3C are plan views showing another examples of the hopper body of the feeding hopper 13 and the hopper body of the weighing hopper 14 of Embodiment 1.

A hopper body HB1 of FIG. 3A is defined by five side walls W11 to W15, and its horizontal cross-section has a pentagonal contour having convex regions. In this example, an angle formed between the side wall W11 and the side wall W15 is 90 degrees and an angle formed between the side wall W14 and the side wall W15 is 90 degrees. On the other hand, angles each of which is formed between another adjacent side walls are greater than 90 degrees. Therefore, as compared to the conventional rectangular hopper 52 in which all angles formed by adjacent side walls of all pairs are 90 degrees, the powders of the objects and the like are less likely to stay in the corner portions of the hopper body HB1, and the hopper body HB1 can be cleaned easily.

A hopper body HB2 of FIG. 3B is defined by six side walls W21 to W26 and its horizontal cross-section has a hexagonal contour having convex regions.

A hopper body HB3 of FIG. 3C is defined by four side walls W31 to W34 and its horizontal cross-section has a contour having convex regions. In this example, the side wall W32 has a curved surface (horizontal-cross section has a circular-arc shape). The side wall W32 having the curved surface makes it possible to improve a second moment in cross-section, and enhance a stiffness of the hopper body HB3. In this example, moreover, the side wall 34 may have a curved surface.

Alternatively, in the combination weigher of the present embodiment, a hopper (memory hopper) which holds the objects discharged from the weighing hopper 14 for a specified time and discharges the objects may be disposed obliquely below each of the weighing hoppers 14. The weighing hopper 14 may be configured to selectively discharge the objects to the memory hopper or to the collecting chute 16. In this case, the memory hopper may be configured like the feeding hopper 13 and the weighing hopper 14, and can reduce its weight in this way.

The feeding hoppers 13 and the weighing hoppers 14 of the present embodiment may be used in a combination weigher in which they are arranged in a shape other than the circular shape as well as in the combination weigher in which these hoppers are arranged in the circular shape as shown in FIG. 1. For example, the feeding hoppers 13 and the weighing hoppers 14 of the present embodiment may be used in, for example, a combination weigher in which the hoppers are arranged in a linear shape, or another shape.

EMBODIMENT 2

A schematic configuration of a combination weigher of Embodiment 2 is similar to the combination weigher of FIG. 1 as described in Embodiment 1.

Figure 4A:
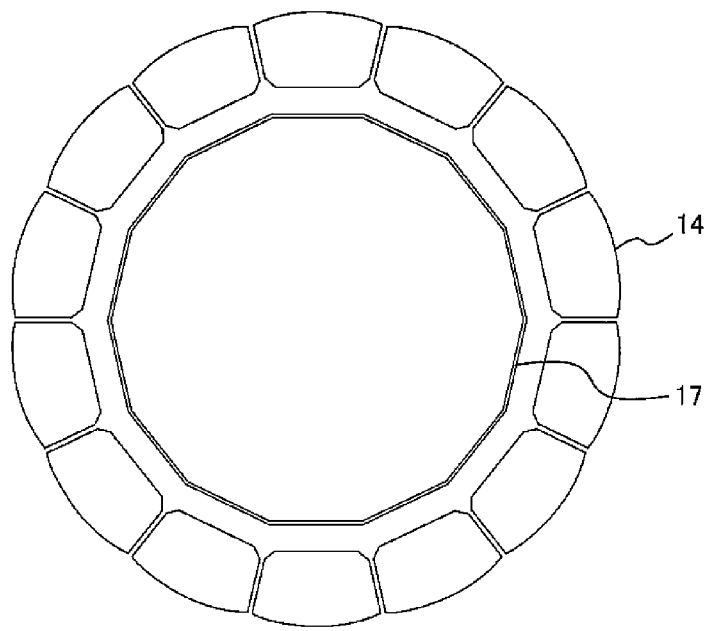
FIG. 4A is a plan view showing a shape and layout of weighing hoppers according to Embodiment 2 of the present invention.
Figure 4B:
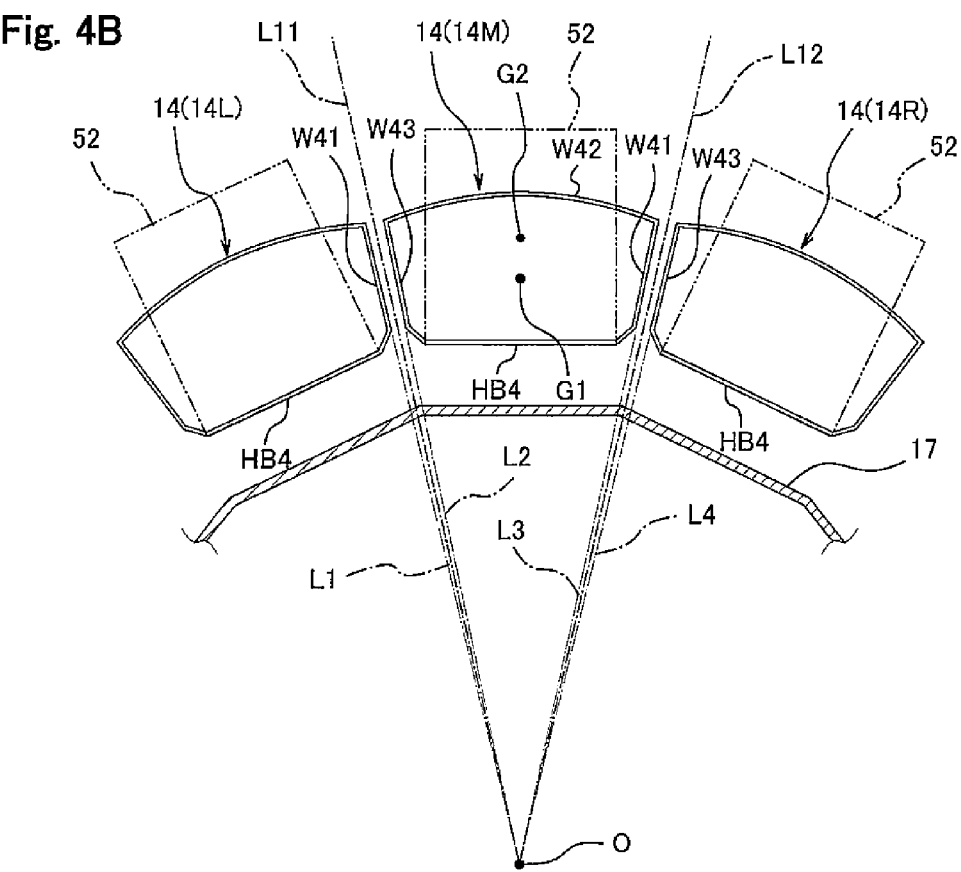
FIG. 4B is an enlarged portion of FIG. 4A.
Figure 5A:
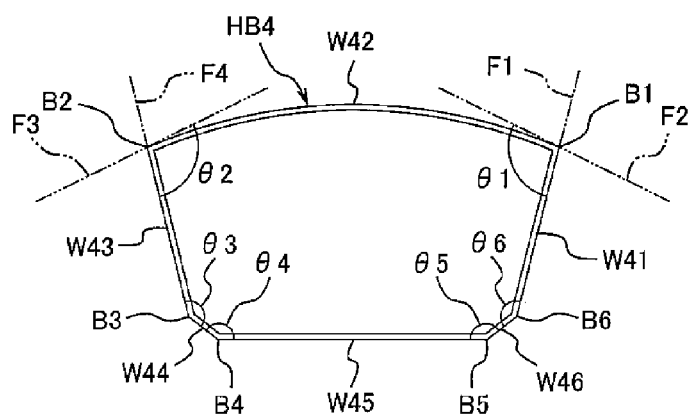
FIG. 5A is a plan view showing an example of a hopper body of a weighing hopper of Embodiment 2.
Figure 5B:
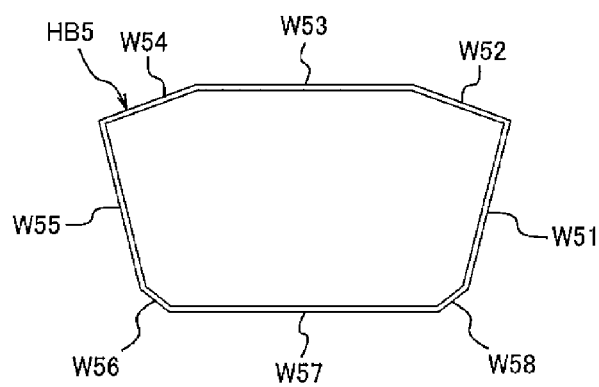
FIG. 5B, FIG. 5C, and FIG. 5D are plan views showing another examples of the hopper body of the weighing hopper according to Embodiment 2.
Figure 5C:
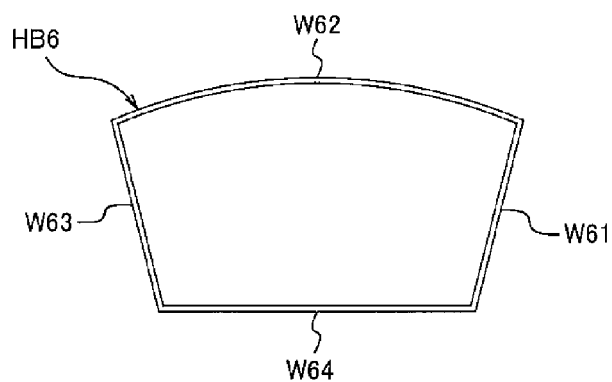
Figure 5D:
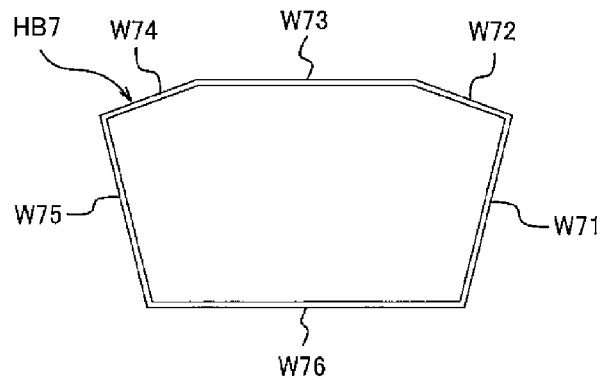

FIG. 4A is a plan view showing a shape and layout of weighing hoppers of the present embodiment, and FIG. 4B is an enlarged portion of FIG. 4A. In FIGS. 4A and 4B, only the hopper bodies of the weighing hoppers 14 are illustrated, but the discharge gates, mounting members fastened to the hopper bodies, etc., are not illustrated. FIG. 5A is a plan view showing an example of a hopper body of a weighing hopper of the present embodiment. FIG. 5B, FIG. 5C, and FIG. 5D are plan views showing another examples of the hopper body of the weighing hopper of the present embodiment.

As shown in FIG. 5A, a hopper body HB4 of each of the weighing hoppers 14 as shown in FIGS. 4A and 4B has six side walls W41 to W46 and has a tubular shape having an upper opening and a lower opening. The hopper body HB4 has a horizontal cross-section having a contour of convex regions. In this example, a side wall W42 located at an outer side of the combination weigher has a curved surface (circular-arc horizontal cross-section). As shown in FIG. 4B, extended lines (L1 to L4, and the like) along wall surfaces of side walls W41 and W43 of each of the weighing hoppers 14, which side walls are adjacent to the weighing hoppers 14 located at both sides of that weighing hopper 14, pass through a center O of a circle along which the weighing hoppers 14 are arranged. In other words, the surfaces of the flat-plate side walls W41 and W43 of each weighing hopper 14, which side walls are adjacent to the weighing hoppers 14 located at both sides of that weighing hopper 14, and the center O of the circle are included in substantially the same plane. The feeding hoppers 13 are configured like the weighing hoppers 14.

In the above configuration, in the case of hoppers of an equal volume, as shown in FIG. 4B, a portion of a space Ws (see FIG. 6B) between the conventional rectangular hoppers 52 having a volume equal to that of the weighing hopper 14 is used as a region of the weighing hopper 14, so that a space (gap) between the adjacent weighing hoppers 14 can be reduced, and an outer peripheral radius of a layout region of the weighing hoppers 14 can be reduced. Because of this, a center-of-gravity G1 of the weighing hopper 14 can be made closer to the casing 17 as compared to a center-of-gravity G2 of the conventional rectangular hopper 52. In other words, the center-of-gravity of the weighing hopper 14 can be made closer to the load cell 15 (see FIG. 1) disposed in a predetermined position inside the casing 17. In addition to the reduction of the weight of the weighing hopper 14 as described in Embodiment 1, the center-of-gravity of the weighing hopper 14 can be made closer to the load cell 15. Therefore, the characteristic frequency of the weighing unit can be increased, and a responsiveness can be improved. As a result, a weighing speed of the combination weigher can be improved.

In addition, the diameter of the circle along which the plurality of weighing hoppers 14 are arranged can be reduced, and the diameter of the circle along which the plurality of feeding hoppers 13 are arranged can be reduced as well. Therefore, an outer shape dimension of the combination weigher can be reduced, and the combination weigher can be made compact.

FIG. 5B, FIG. 5C, and FIG. 5D are plan views showing another examples of the hopper body of the feeding hopper 13 and the weighing hopper 14 of the present embodiment.

A hopper body HB5 of FIG. 5B has a structure in which the side wall W42 of the curved surface shape of the hopper body HB4 of FIG. 5A is replaced by three side walls W52 to W54 of a flat surface shape. The hopper body HB5 is defined by 8 side walls W51 to W58 and its horizontal cross-section has an octagonal contour having convex regions.

A hopper body HB6 of FIG. 5C has a structure in which the hopper body HB4 of FIG. 5A is not provided with the side walls W44 and W46. The hopper body HB6 is defined by 4 side walls W61 to W64 and its horizontal cross-section has a contour having convex regions.

A hopper body HB7 of FIG. 5D has a structure in which the side wall W62 of the curved surface shape of the hopper body HB6 of FIG. 5C is replaced by side walls W72 to W74 of a flat surface shape. The hopper body HB7 is defined by 6 side walls W71 to W76 and its horizontal cross-section has a hexagonal contour having convex regions.

Although in the present embodiment, the extended lines (L1 to L4, and the like) along the wall surfaces of the side walls W41 and W43 of each of the weighing hoppers 14, which side walls are adjacent to the weighing hoppers 14 located at both sides of that weighing hopper 14, pass through the center O of the circle along which the weighing hoppers 14 are arranged as shown in FIG. 4B, adjacent side walls of adjacent weighing hoppers 14 may be substantially parallel to each other. In this case, also, a portion of the space Ws (see FIG. 6B) between the conventional rectangular hoppers 52 can be used as a region of the weighing hopper 14, and the center-of-gravity of the weighing hopper 14 can be made closer to the casing 17 as compared to the center-of-gravity G2 of the conventional rectangular hopper 52. For example, when the three weighing hoppers 14 of FIG. 4B are assigned with reference symbols 14L, 14M, and 14R, from the left to the right, the side wall W41 of the weighing hopper 14L at the left and the side wall W43 of the weighing hopper 14M at the center are substantially parallel to each other, and the side wall W41 of the weighing hopper 14M at the center and the side wall W43 of the weighing hopper 14R at the right are substantially parallel to each other. In this case, the side wall W41 of the weighing hopper 14L at the left and the side wall W43 of the weighing hopper 14M at the center extend along a virtual line L11 extending between these side walls and to the center O of the circle along which the plurality of weighing hoppers 14 are arranged. Likewise, the side wall W41 of the weighing hopper 14M at the center and the side wall W43 of the weighing hopper 14R at the right extend along a virtual line L12 extending between the side walls and to the center O of the circle. This layout is preferable, because, in this configuration, the hopper body HB4 is laterally symmetric. The above applies to the hopper bodies HB5 to HB7 shown in FIG. 5B to 5D.

In the combination weigher of the present embodiment, a hopper (memory hopper) which holds objects discharged from each weighing hopper 14 for a specified time and discharges the objects may be provided obliquely below that weighing hopper 14, and the weighing hopper 14 may be configured to selectively discharge the objects to the memory hopper or to the collecting chute 16. In this case, the memory hopper may be configured like the feeding hopper 13 and the weighing hopper 14, and the weight of the memory hopper can be reduced.

Next, a configuration common to all of the weighing hoppers and all of the feeding hoppers described in Embodiment 1 and Embodiment 2 will be described.

Each of the hopper bodies of all of the weighing hoppers and all of the feeding hoppers described in Embodiment 1 and Embodiment 2 is formed by a tubular body having 4 or more side walls which are connected together in an annular shape, and its horizontal cross-section has the contour of the shape having the convex regions, which is different from the rectangular shape. In addition, the hopper body has a shape in which at a boundary portion between adjacent side walls of all pairs, the angle ($\theta$) which is formed between a first virtual plane contacting one of the adjacent side walls and a second virtual plane contacting the other side wall, and is located at a side of a region to which the objects are fed is equal to or greater than 90 degrees. This will be described below.

Firstly, a description will be given of a case where at least one of two adjacent side walls is a side wall of a curved surface shape. For example, in the case of the side wall W41 of a flat surface shape (flat plate shape) and the side wall W42 of a curved surface shape in the hopper body HB4 of FIG. 5A, at a boundary portion B1 between these adjacent side walls, an angle ($\theta 1$) which is formed between a virtual plane F1 contacting the side wall W41 and a virtual plane F2 contacting the side wall W42, and is located at a side of a region to which the objects are fed, is equal to or greater than 90 degrees C. Likewise, in the case of the side wall W42 of a curved surface shape and the side wall W43 of a flat surface shape in the hopper body HB4 of FIG. 5A, at a boundary portion B2 between these adjacent side walls, an angle ($\theta 2$) which is formed between a virtual plane F3 contacting the side wall W42 and a virtual plane F4 contacting the side wall W43, and is located at a side of a region to which the objects are fed, is equal to or greater than 90 degrees C. In a case where adjacent side walls have a flat surface shape, the above angle $\theta$ is equal to the angle formed between two adjacent side walls. In the hopper body HB4, the angles of $\theta 3$ to $\theta 6$ of the boundary portions B3 to B6 of two adjacent side walls of a flat surface shape are equal to or greater than 90 degrees. In this configuration, two or more angles of the angles $\theta$ are greater than 90 degrees.

Since the horizontal cross-section of the hopper body has the contour of the shape having the convex regions, the angle $\theta$ is equal to or less than 180 degrees in a case where two adjacent side walls include a side wall of a curved surface shape, while the angle $\theta$ is less than 180 degrees in a case where both of two adjacent side walls have a flat surface shape. In a case where all wall surfaces of the hopper body have a flat surface shape (flat plate shape), i.e., the horizontal cross-section of the hopper body has a polygonal shape having five or more sides, the horizontal cross-section has a convex polygonal shape, and all of the angles $\theta$ each of which is formed between adjacent wall surfaces are less than 180 degrees.

Although in Embodiment 1 and Embodiment 2, the structure of the discharge gate 13G (FIG. 1) of the feeding hopper 13 and the discharge gate 14G (FIG. 1) of the weighing hopper 14 are not described in detail, the discharge gate 13G and the discharge gate 14G may be designed suitably according to the shapes of the hopper bodies so that the objects are held within each hopper when the corresponding discharge gate is closed and the objects are discharged from the hopper when the corresponding discharge gate is opened. As should be well known, each of the discharge gates 13G and 14G may constituted by two gates as shown in FIG. 1 or otherwise one gate.

Numeral modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

The present invention is useful as a hopper which reduce its weight and can lessen a burden placed on an operator who carries out a work for attaching, detaching, washing, etc., of the hopper, and a combination weigher using the hopper, etc.

REFERENCE SIGNS LISTS 13 feeding hopper
13B hopper body
13G discharge gate
14 weighing hopper
14B hopper body
14G discharge gate
15 load cell
16 collecting chute
17 center base body
18 controller
20 coupling member
HB1 to HB7 hopper body
W1 to W8 side wall
W11 to W15 side wall
W21 to W26 side wall
W31 to W34 side wall
W41 to W46 side wall
W51 to W58 side wall
W61 to W64 side wall
W71 to W76 side wall
B1 to B6 boundary portions between adjacent side walls
F1 to F4 virtual plane
L11, L12 virtual line

The invention claimed is:

1. A combination weigher which finds a combination of objects having a total weight that falls within a predetermined weight range and discharges the objects making up the combination, the combination weigher comprising:
a plurality of weighing hoppers arranged in the combination weigher in a circular shape around a casing;
a plurality of load cells disposed inside of the casing and supporting the weighing hoppers, respectively, via coupling members penetrating the casing;
each hopper in the plurality of weighing hoppers comprising a tubular hopper body having an upper opening, a lower opening, and being positioned to be fed through the upper opening with the objects making up the combination, each hopper having a discharge gate which opens and closes the lower opening of the tubular hopper body;
wherein the tubular hopper body includes four or more side walls connected together in an annular shape, the four or more side walls including an outer side wall disposed radially outward relative to the casing, an inner side wall disposed radially inward relative to the casing, and first and second lateral side walls, the tubular hopper body having a horizontal cross-section shaped to be non-rectangular and having convex regions;
the tubular hopper body further shaped such that a boundary portion between any two adjacent side walls forms an angle between a first virtual plane contacting a first one of the adjacent side walls and a second virtual plane contacting a second one of the adjacent side walls, the angle located at a side of a region to which the objects are fed and being equal to or greater than 90 degrees;
wherein the first lateral side wall of an arbitrary one of the plurality of weighing hoppers is adjacent to the second lateral side wall of a first next adjacent one of the plurality of weighing hoppers and the second lateral sidewall of the arbitrary one of the plurality of weighing hoppers is adjacent to the first lateral side wall of a second next adjacent one of the plurality of weighing hoppers, and wherein the first and second lateral side walls have a flat plate shape and surfaces of the first and second lateral side walls are disposed along first and second planes, respectively, that extend from a center of the circular shape about which the plurality of weighing hoppers are arranged; and
wherein, when the tubular hopper body is placed with the inside side wall at a first distance from the casing, the horizontal cross section of the tubular hopper body will have a first center of gravity, the first center of gravity being closer to the casing than a second center of gravity of a horizontal cross-section of a conventional rectangular hopper when an inside sidewall of the conventional rectangular hopper is positioned at the first distance from the casing, the conventional weighing hopper having four intersecting sidewalls, wherein all pairs of intersecting sidewalls meet at 90 degrees, and wherein the conventional hopper having a horizontal cross-section with an area equal to an area of a horizontal cross-section of the tubular hopper body.

2. The combination weigher according to claim 1, wherein the outer side wall of the tubular hopper body has a circular-arc shape.

3. A combination weigher which finds a combination of objects having a total weight that falls within a predetermined weight range and discharges the objects making up the combination, the combination weigher comprising:
a plurality of weighing hoppers arranged in the combination weigher in a circular shape around a casing;
a plurality of load cells provided inside of the casing and supporting the weighing hoppers, respectively, via coupling members penetrating the casing;
each hopper in the plurality of weighing hoppers comprising a tubular hopper body having an upper opening, a lower opening, and being positioned to be fed through the upper opening with the objects making up the combination, each hopper having a discharge gate which opens and closes the lower opening of the tubular hopper body;
wherein the tubular hopper body includes four or more side walls connected together in an annular shape, the four or more side walls including first and second lateral side walls, the tubular hopper body having a horizontal cross-section shaped to be non-rectangular and having convex regions;
the tubular hopper body further shaped such that a boundary portion between any two adjacent side walls forms an angle between a first virtual plane contacting a first one of the adjacent side walls and a second virtual plane contacting a second one of the adjacent side walls, the angle located at a side of a region to which the objects are fed and being equal to or greater than 90 degrees;
wherein a first lateral side wall of a first one of the weighing hoppers is adjacent a second lateral side wall of a next adjacent second one of the weighing hoppers, and wherein the first lateral side wall of the first one of the weighing hoppers is parallel to the second lateral side wall of the next adjacent second one of the weighing hoppers;
wherein, when the tubular hopper body is placed with the inside side wall at a first distance from the casing, the horizontal cross section of the tubular hopper body will have a first center of gravity, the first center of gravity being closer to the casing than a second center of gravity of a horizontal cross-section of a conventional rectangular hopper when an inside sidewall of the conventional rectangular hopper is positioned at the first distance from the casing, the conventional weighing hopper having four intersecting sidewalls, and wherein all pairs of intersecting sidewalls meet at 90 degrees, and the conventional hopper having a horizontal cross-section with an area equal to an area of a horizontal cross-section of the tubular hopper body.

4. The combination weigher according to claim 3, wherein the first lateral side wall of the first one of the weighing hoppers the second lateral side wall of the second one of the weighing hoppers extend along a first and second virtual line, respectively, extending toward a center of the circular shape about which the plurality of weighing hoppers are arranged.

5. The combination weigher according to claim 4, wherein the outer side wall of the tubular hopper body has a circular-arc shape.

6. The combination weigher according to claim 3, wherein the outer side wall of the tubular hopper body has a circular-arc shape.

* * * * *